US007922568B1

(12) United States Patent
Byrd

(10) Patent No.: US 7,922,568 B1
(45) Date of Patent: Apr. 12, 2011

(54) GAME CARCASS SPREADING DEVICE

(76) Inventor: Donald Byrd, Shingle Springs, CA (US)

( * ) Notice: Subject to any disclaimer, the term of this patent is extended or adjusted under 35 U.S.C. 154(b) by 0 days.

(21) Appl. No.: 12/651,537

(22) Filed: Jan. 4, 2010

(51) Int. Cl.
*A22B 5/06* (2006.01)
(52) U.S. Cl. ....................................................... 452/197
(58) Field of Classification Search .......... 452/174–176, 452/185, 191, 192, 197
See application file for complete search history.

(56) References Cited

U.S. PATENT DOCUMENTS

| | | | |
|---|---|---|---|
| 4,909,555 A | 3/1990 | Blasi | |
| 5,360,368 A | 11/1994 | Hajek | |
| 5,707,281 A * | 1/1998 | Hicks | 452/197 |
| 6,059,649 A | 5/2000 | Ballard | |
| 7,222,903 B2 | 5/2007 | Tardiff | |
| 7,387,567 B1 * | 6/2008 | Bailey | 452/197 |
| 7,588,490 B1 * | 9/2009 | Warner et al. | 452/197 |
| 2004/0157542 A1 | 8/2004 | Bloch | |

* cited by examiner

*Primary Examiner* — Thomas Price
(74) *Attorney, Agent, or Firm* — Montgomery Patent and Design; Robert C. Montgomery; Joseph T. Yaksich

(57) ABSTRACT

A device to assist in the field dressing of game animals, comprising two (2) tube portions which telescopingly slide inside of each another and mechanically secured at a desired length, is herein disclosed. The device may be used on different sized animals via a spring-loaded button and a plurality of button receiving holes. Each end of the device comprises a toothed portion which enables the device to better grip a carcass which is to be field dressed. Spiked end caps are also provided for increased anchoring of the device to the carcass. The device is preferably made of light-weight aluminum or similar materials and is provided with a belt mounted holster to allow the user to carry the device in the field. Such features allow the user to clean the animal carcass out while protecting the meat from spoilage by helping to aerate the meat for faster glazing.

20 Claims, 4 Drawing Sheets

GAME CARCASS SPREADING DEVICE

RELATED APPLICATIONS

The present invention was first described in a notarized Official Record of Invention on Dec. 2, 2008, that is on file at the offices of Montgomery Patent and Design, LLC, the entire disclosures of which are incorporated herein by reference.

FIELD OF THE INVENTION

The present invention relates generally to animal carcass spreading devices, and more particularly, to a length adjustable game carcass spreading device to assist in the field dressing of game animals.

BACKGROUND OF THE INVENTION

Over the years, modern advances in hunting equipment have enhanced the sport, providing hunters with increased success. High powered rifles, extremely accurate archery equipment, high quality optic scopes, GPS systems, and the like certainly add to the enjoyment of the sport simply by increasing the chances of a kill. However, many aspects of hunting still remain the same. An example of this is the common stick, that is cut to size to help hold the animal carcass open while cleaning and gutting the animal, and then retaining it in an open position to help protect the meat from spoilage. Many hunters simply scrounge for a nearby branch to perform this task, but it is never the exact size needed, and much time can be wasted looking for the proper branch and then cutting it to size. Additionally, as the entrails of the animal are removed there is often a need to further spread the chest cavity of the animal for complete gutting.

Some attempts have been made to provide improved game spreading devices or similar spreading devices. These attempts can be seen by reference in several U.S. patents including, but not limited to the references described below.

U.S. Pat. No. 4,909,555, issued in the name of Blasi, describes a collapsible adjustable animal gambrel. The Blasi device comprises a pair of telescopic members having a retainer pin to secure the members, an impaling hook secured to the end of each member, and a means to hang the gambrel.

U.S. Pat. No. 5,360,368, issued in the name of Hajek, describes a wild game dressing tool. The Hajek device comprises a pair of outwardly spaced hooks, a hook extension member, and a plurality of tubular coupling members for connecting the hooks.

U.S. Pat. No. 5,707,281, issued in the name of Hicks, describes a game carcass spreader. The Hicks device comprises a crossbar with spreader arms having curved members with spiked end portions. One (1) spreader arm is fixed to the crossbar and one spreader arm is slidably mounted to the crossbar having a handle and ratchet lever to permit movement.

U.S. Pat. No. 7,222,903, issued in the name of Tardiff, describes a spreader bar apparatus for use in lifting operations. The Tardiff device comprises a hollow elongated member having two (2) end members which extend outward from an interior of the hollow elongated member. A plurality of pin members is used to secure the end members to the elongated member at a desired length.

U.S. Pat. No. 7,387,567, issued in the name of Bailey, describes an adjustable game carcass spreader device. The Bailey device comprises a pair of slidably connected tubular members having a pin adjustment system. The device further comprises a second adjustment system having a third tubular member threadingly connected to one (1) of the tubular members and a plurality of cap members to cover the end portions of the tubular members.

While these devices may fulfill their respective, particular objectives, each suffers from one (1) or more disadvantages or deficiencies; including being overly complex, lacking versatility and limiting overall use, lack of simple and effective length adjustments, or failing to provide an effective means of embedding the device to the flesh of the animal carcass.

Accordingly, there exists a need for a means by which wild game carcasses can be kept in an open position without the disadvantages as described above. The development of the present invention substantially departs from the conventional solutions and in doing so fulfills this need.

SUMMARY OF THE INVENTION

In view of the foregoing art, the inventor recognized the aforementioned inherent problems and observed that there is a need for a light weight and durable game carcass spreading device having a means to selectively adjust an overall length in a simple manner and to securely hold a chest cavity of the game carcass open during field dressing and thus, the object of the present invention is to solve the aforementioned disadvantages and provide for this need.

To achieve the above objectives, features of the present invention provides game carcass spreading device comprising an outer tube portion comprising an elongated tube with a consistent diameter having an open distal end, a proximal end, and a plurality of outer apertures longitudinally disposed through and an inner tube portion comprising an elongated tube with a consistent diameter having a distal end, a proximal end, and a single inner aperture. The proximal end of the inner tube portion is insertably coupled in the open distal end of the outer tube portion.

Another feature of the present invention provides a locking button affixed to a spring for releasably coupling the outer tube portion to the inner tube portion for selectively adapting a fixed coupled length of the outer tube portion and the inner tube portion. The spring urges the locking button to extend through the inner aperture and selectively align with and engage through one (1) of the outer apertures providing the coupled length. The locking button is depressed to disengage from one (1) of the outer apertures, in order to engage an alternate outer aperture such that an alternate fixed coupled length may be achieved.

Another feature of the present invention provides a cylindrical grip member affixed around an exterior of the outer tube comprising a plurality of grip apertures, each of the grip apertures disposed superjacent to a corresponding outer aperture.

Another feature of the present invention provides a plurality of notches longitudinally disposed on an exterior surface of the inner tube portion providing visual positional indication of the locking button in relation to the plurality of outer apertures. The plurality of notches corresponds to an engaged position between the locking button and a particular outer aperture.

Another feature of the present invention provides a carrying holster having a substantially cylindrical body with an open-top pouch for receiving and storing the device affixed to a belt attachment strap having a two-slot belt pass-through loop on an upper portion for attaching the holster to a belt of a user.

Another feature of the present invention provides a distal end of the inner tube portion comprises an outwardly extending toothed edge around a perimeter providing a means for engaging an internal surface of a game carcass and the proximal end of the outer tube portion comprises an outwardly extending toothed edge around a perimeter providing a means for engaging an internal surface of a game carcass.

Another feature of the present invention provides an outer tube portion further comprising an outer tube end cap which is removably attached to the proximal end of the outer tube portion, and the inner tube portion further comprises an inner tube end cap which is removably attached to the distal end of said inner tube portion. The outer tube cap comprises a cylindrical body having an open end suitably sized to receive the proximal end of the outer tube portion and a centrally-positioned spike protruding outwardly providing an alternate means of engaging the internal surface of a game carcass. The inner tube cap comprises a cylindrical body having an open end suitably sized to receive the distal end of the inner tube portion and a centrally-positioned spike protruding outwardly providing an alternate means of engaging the internal surface of a game carcass.

The present invention further provides a method of utilizing the device that allows for dressing, cleaning, and preservation of killed game in a manner which is quick, easy and effective.

Furthermore, the described features and advantages of the invention may be combined in various manners and embodiments as one skilled in the relevant art will recognize. The invention can be practiced without one (1) or more of the features and advantages described in a particular embodiment.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
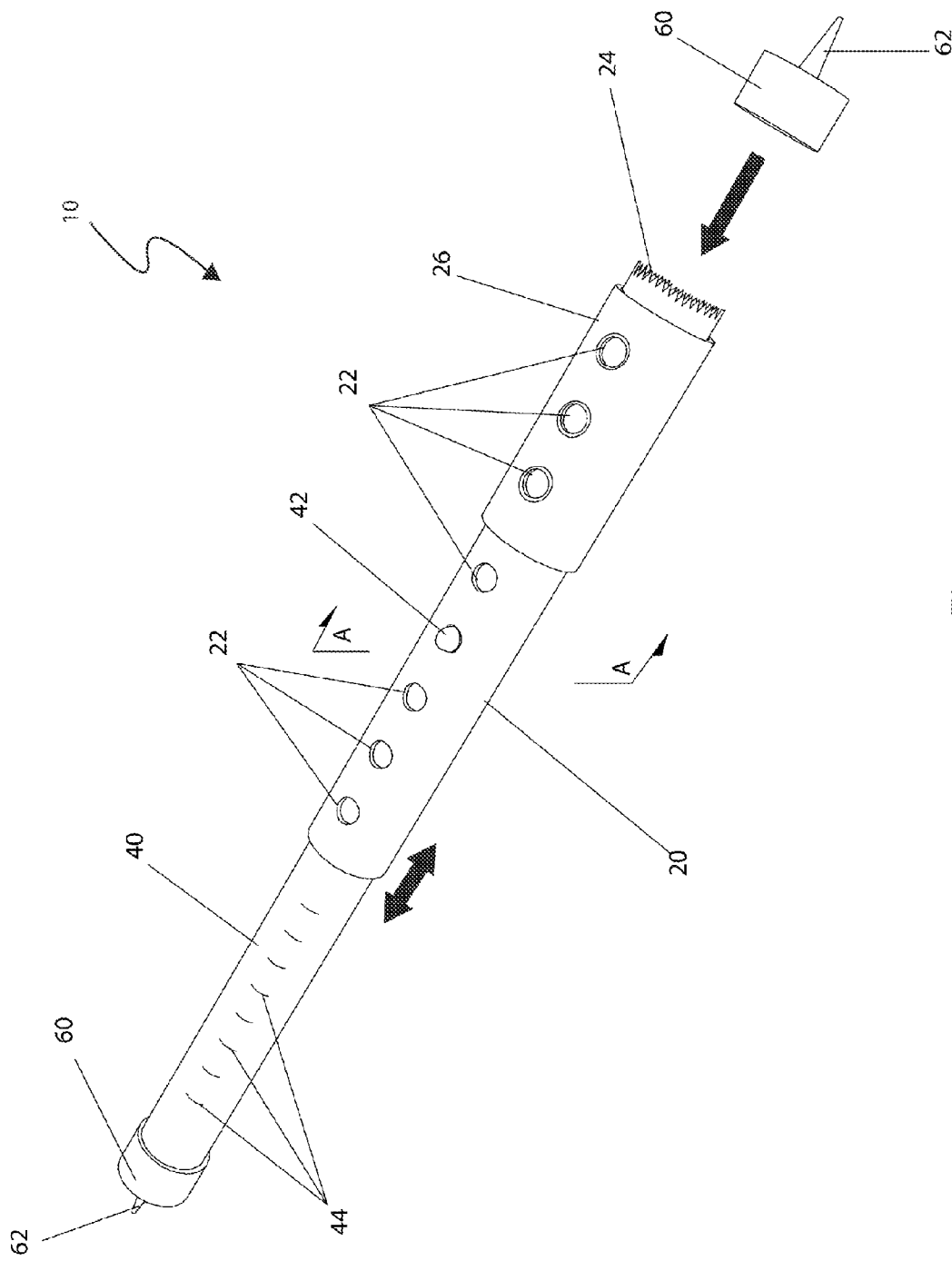
FIG. 1 is a perspective view of a game carcass spreading device 10, according to a preferred embodiment of the present invention.

DESCRIPTIVE KEY 10 game carcass spreading device
20 outer tube
22 aperture
24 toothed edge
26 grip
40 inner tube
42 locking button
44 notch
46 spring -continued 60 end cap
62 spike
100 carcass
110 chest cavity
150 holster
152 belt loop
153 pouch
160 user
165 belt

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a game carcass spreading device (herein described as the "device") 10, which provides a means to assist in the field dressing of game carcasses 100, comprising an outer tube portion 20 and a corresponding telescopingly engaging inner tube portion 40 to allow application of the device 10 on a variety of different sized animal carcasses 100. A spring-loaded locking button 42 integral thereto the inner tube portion 40 allows quick adjustment of an overall length of the device 10 via engagement thereinto one (1) of approximately ten (10) equally-spaced drilled apertures 22 along an outer surface. Each end portion of the device 10 comprises a toothed edge 24 which enables the device to better grip an internal surface of the game carcass 100 during field dressing. Furthermore, a pair of removably attached spiked end caps 60 is provided if more secure anchoring of the device 10 is necessary. The device 10 is envisioned being made of light-weight aluminum; however, other materials may be introduced such as, but not limited to: stainless steel, fiberglass, or similar materials with equal benefit. Finally, the device 10 comprises a belt-mounted carrying holster 150 to allow a user 160 to carry the device 10 in the field. Such features allow the user 160 to quickly clean a carcass 100, protect the meat from spoilage, and help aerate meat portions for faster glazing.

Referring now to FIG. 1, a perspective view of the device 10, according to the preferred embodiment of the present invention, is disclosed. The device 10 comprises an outer tube 20, an inner tube 40, a plurality of notches 44, a first end cap 60, and a second end cap 61. The outer tube 20 comprises an open-ended length of aluminum tubing approximately one (1) inch in diameter and ten (10) inches long. The outer tube 20 further comprises an inside diameter particularly sized so as to slidingly receive the inner tube portion 40 therewithin in a telescoping manner. The outer tube 20 further comprises a cylindrical grip 26 therearound an outward extending portion to improve a user's 160 grasp of the device 10 during use. The grip 26 is envisioned being made using a rubber compound and being affixed thereto said outer tube 20 using common adhesives.

A relative extended position of said tubes 20, 40 is fixed via a spring-loaded locking button 42 being integral thereto the inner tube 40. Said locking button 42 protrudes therethrough a plurality of equally-spaced apertures 22 arranged thereal-ong an external surface of the outer tube 20 and spaced approximately one (1) inch apart in a linear fashion (see FIG. 3).

The outer 20 and inner 40 tubes further comprise toothed edge portions 24 located thereat respective outwardly extend-ing end portions (one shown here). Said toothed edges 24 provide increased grip thereinto a surface of the game carcass 100 along a chest cavity portion 110. Additionally, a pair of removably attachable end caps 60, 61 are also provided as accessory portions to provide additional grip if needed ther-ebetween the game carcass 100 and the device 10 via respec-tive integral spikes 62. The end caps 60, 61 each comprise a cylindrical shape with a single open end portion. Said end caps 60, 61 further comprise specific inside diameters form-ing a friction fit thereupon respective outer 20 and inner 40 tubes. Each spike 62 is centrally-positioned thereupon a closed-end portion of the end cap 60, 61 comprising a pointed cylindrical protrusion approximately one-half (½) inch long and extending therefrom said end cap 60, 61 in a perpendicu-lar manner being designed to penetrate flesh portions along internal surfaces of the chest cavity 110, thereby positively securing a position of said device 10 therewithin.

The inner tube 40 further comprises a row of equally-spaced notches 44 being milled or scribed along an external surface. The notches 44 are arranged in a corresponding man-ner therewith the apertures 22 so as to provide an additional aid to a user 160 when extending and locking the device 10. While extending the device 10, alignment of a particular notch 44 therewith an end portion of the outer tube 20, cor-respondingly pre-aligns the locking button 42 therewith an adjacent aperture 22. A slight twist of the inner tube 40 with respect to the outer tube 20 quickly engages the locking button 42 thereinto said aperture 22, thereby securing the device 10 at a desired length.

Figure 2:
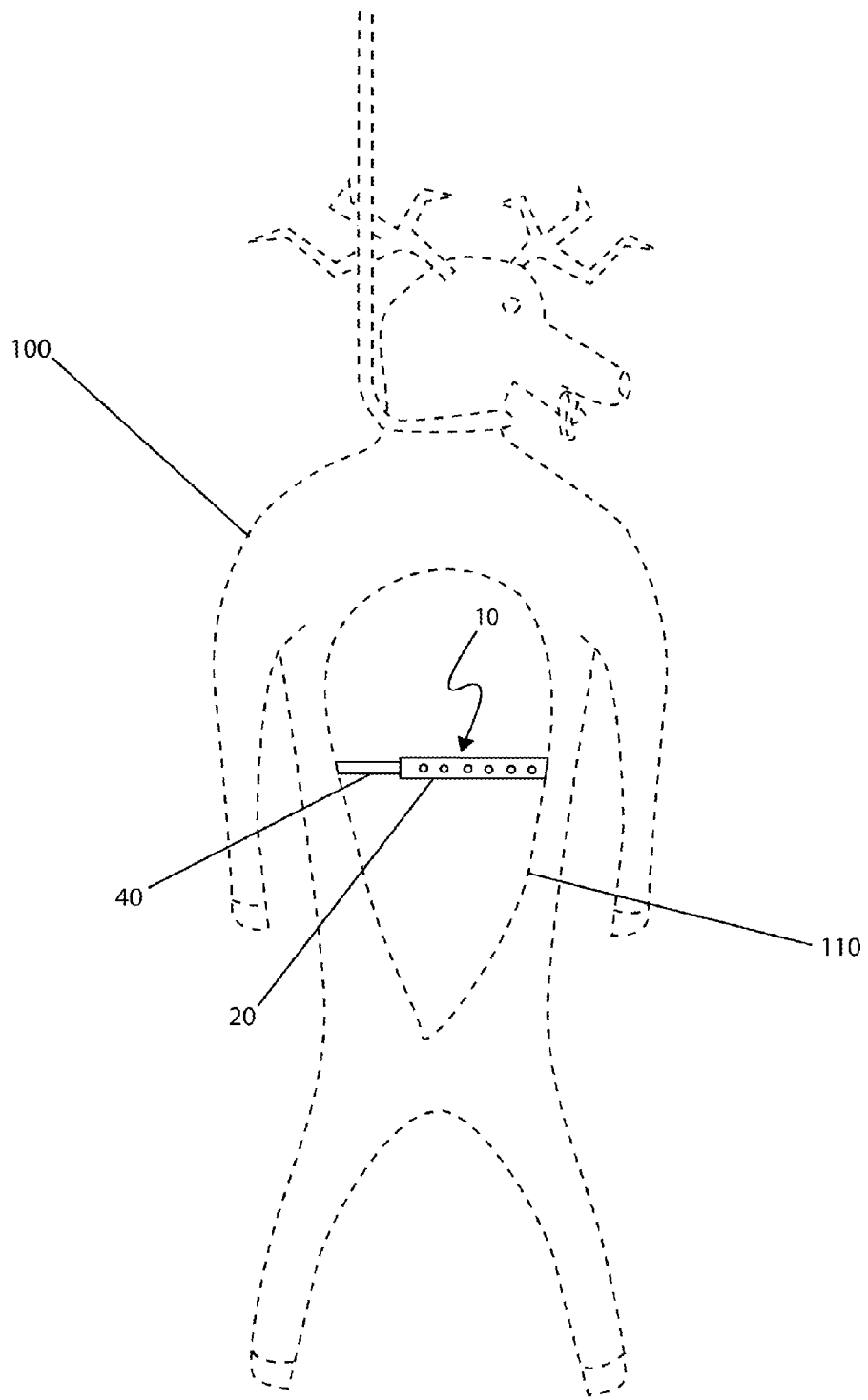
FIG. 2 is an environmental view of the game carcass spreading device 10 depicting an in-use state therewithin a game carcass 100, according to a preferred embodiment of the present invention.

Referring now to FIG. 2, an environmental view of the device 10 depicting an in-use state therewithin a game carcass 100, according to the preferred embodiment of the present invention, is disclosed. In use, the device 10, while in a collapsed state, is inserted thereto an open chest cavity 110 of the game carcass 100. Subsequently, the device 10 is expanded thereto a desired length using the locking button 42 and corresponding apertures 22, thereby securing a desired length and applying an outward force thereto said chest cavity 110 to increase a width of a frontal access opening thereof.

The device 10 is illustrated here being applied thereto a harvested deer carcass; however, the device 10 is to provide a minimum and maximum overall length being sufficient so as to effectively spread a frontal chest cavity 110 of most game animals such as deer, wild boar, bear, and the like; however, it is also understood that the device 10 may also be utilized during butchering of other animals such as cattle, sheep, swine, and the like, with equal benefit and as such should not be interpreted as a limiting factor of the device 10.

Figure 3:
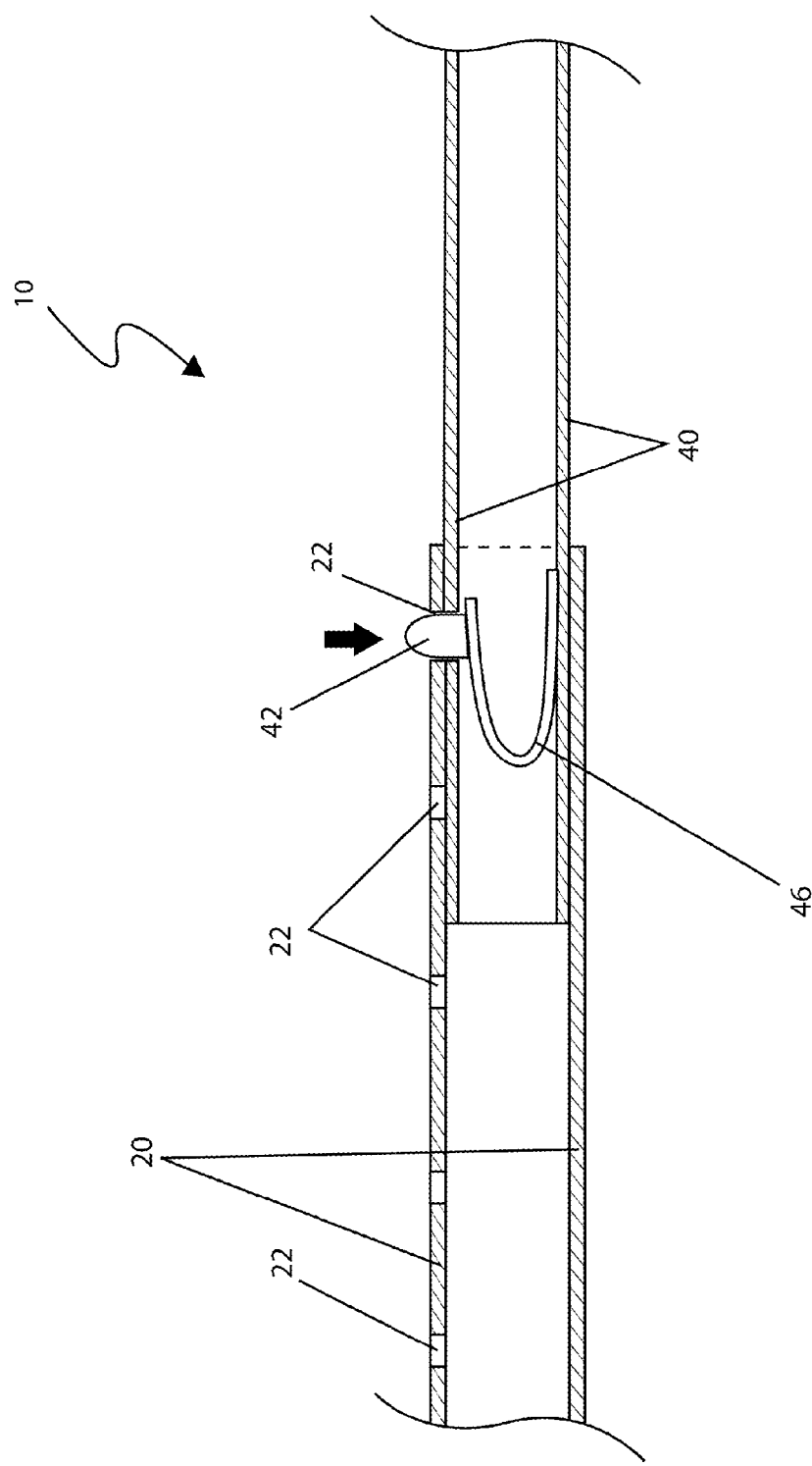
FIG. 3 is a section view of the game carcass spreading device 10 taken along section A-A (see FIG. 1), according to a preferred embodiment of the present invention; and, FIG. 4 is another environmental view of the game carcass spreading device 10 depicting a holster portion 150, according to a preferred embodiment of the present invention.

Referring now to FIG. 3, a section view of the device 10 taken along section A-A (see FIG. 1), according to a preferred embodiment of the present invention, is disclosed. The device comprises a plurality of apertures 22, a locking button 42, and a spring 46. The apertures 22 enable selective insertion of the locking button 42 therethrough, thereby allowing an overall length adjustment means of the device 10 in approximately one (1) inch increments. The device 10 is envisioned to pro-vide a range of overall lengths of approximately ten (10) inches when collapsed, to approximately twenty (20) inches when fully extended. The spring 46 comprises a "U"-shaped band spring further providing an attachment means thereto the locking button 42 via a common fastening means such as welding, riveting, screwing, or the like. Said spring 46 and locking button 42 are envisioned to be similar to like devices utilized on tent poles and awning frames.

Figure 4:
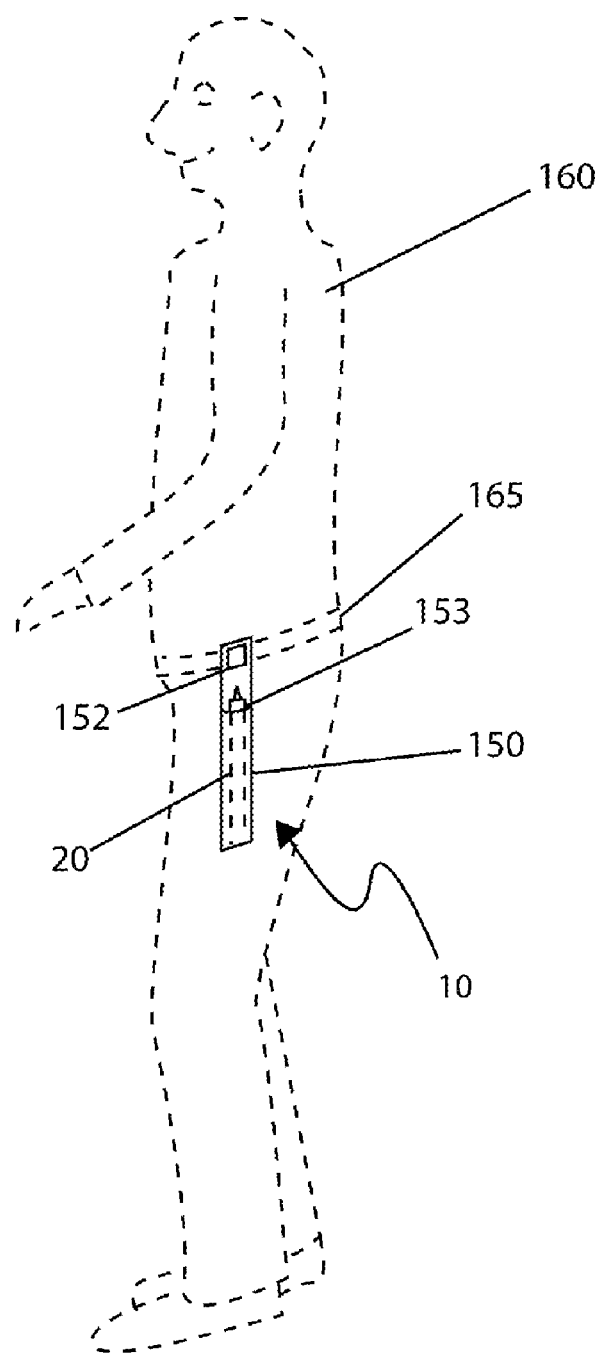

Referring now to FIG. 4, another environmental view of the game carcass spreading device 10 depicting a holster portion 150, according to a preferred embodiment of the present invention, is disclosed. The holster 150 provides a protective storage and transportation means thereto the device 10 enabling a user 160 to conveniently affix said device 10 thereto a waist belt 165. The holster 150 comprises an open-top pouch 153, thereby allowing easy insertion and removal of the device 10 therefrom. Said holster 150 further comprises a conventional two-slot pass-through belt loop 152 attach-ment means for permitting the passage of a belt 165 there-through, thereby providing a securing means for the holster 150. The holster 150 is constructed using cut portions of durable materials such as leather, canvas, weaved nylon, or the like, being assembled using standard textile or leather sewing and joining processes common in the industry.

It is envisioned that other styles and configurations of the present invention can be easily incorporated into the teach-ings of the present invention, and only one particular configu-ration shall be shown and described for purposes of clarity and disclosure and not by way of limitation of scope.

The preferred embodiment of the present invention can be utilized by the common user in a simple and effortless manner with little or no training. After initial purchase or acquisition of the device 10, it would be utilized and worn as indicated in FIGS. 2 and 4.

The method of utilizing the device 10 may be achieved by performing the following steps: installing the holster 150 thereupon a user's belt 165 using the belt loop 152 feature; installing the two (2) end caps 60 thereupon opposing end portions of the device 10, is desired; inserting the device 10 therein the pouch portion 153 of the holster 150 in a collapsed state; carrying the device 10 within the holster 150 until the device 10 is needed to field dress or butcher a carcass 100; harvesting an animal in a normal manner; splitting a brisket portion of the carcass 100 and removing major organs there-from a chest cavity area 110 in a conventional manner; removing the device 10 therefrom the holster 150; removing the end caps 60 if desired, based upon a particular carcass spreading application or animal type; inserting the device 10 thereinto said chest cavity 110 in a collapsed state; grasping the grip portion 26 of the outer tube 20 and pressing the locking button 42 inwardly to release the inner tube 40; rotat-ing the inner tube 40 approximately one-quarter turn, thereby allowing the inner tube 40 to slide freely in a linear direction therewithin the outer tube 20; extending the device 10 against opposing side portions of the chest cavity 110 until obtaining a desired overall length of the device 10; aligning the closest notch 44 therewith an end portion of the outer tube 20, thereby aligning an aperture 22 thereto the locking button 42; rotating the inner tube 40 until establishing engagement of said lock-ing button 42 thereinto a corresponding pre-aligned aperture 22; embedding the end portion of the inner tube 40 thereinto one side of the chest cavity 110 of the carcass 100 using the toothed edge 24 or spike portions 62; grasping the grip por-tion 26 of the outer tube 20 with one (1) hand while expanding the chest cavity 110 using the other hand; embedding the opposing toothed edge 24 or spike 62 portion of the outer tube 20 thereinto the opposing side of the chest cavity 110, thereby securing said chest cavity 110 therein a spread state; completing a field dressing or butchering task by removing all unwanted remaining internal portions; retaining the device 10, if desired, therewithin the carcass 100 to aerate, cool, and glaze the meat; and, benefiting from a convenient, compact, and adjustable means to improve a field dressing or butchering task while utilizing the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A carcass spreading device, comprising:
    an outer tube portion having an open distal end and a proximal end;
    an inner tube portion having a distal end and a proximal end that is insertably coupled therein said open distal end of said outer tube portion;
    a length adjustment means for selectively adapting a fixed coupled length of said outer tube portion and said inner tube portion; and,
    a cylindrical grip member affixed therearound an exterior of said outer tube;
    wherein said proximal end of said outer tube and said distal end of said inner tube provide a means for engaging an internal surface of a carcass.

2. The device of claim 1, wherein said length adjustment means further comprises:
    a single inner aperture therethrough said proximal end of said inner tube portion;
    a plurality of outer apertures longitudinally disposed therethrough said outer tube portion; and,
    a locking button affixed thereto a spring for releasably coupling said outer tube portion thereto said inner tube portion;
    wherein said spring urges said locking button to extend therethrough said inner aperture;
    wherein said locking button selectively aligns therewith and engages therethrough one of said outer apertures providing said coupled length; and,
    wherein said locking button is depressed to disengage from one of said outer apertures, in order to engage an alternate outer aperture such that an alternate fixed coupled length may be achieved.

3. The device of claim 2, wherein said spring further comprises an arcuate biasing member having an end affixed thereto an interior of said inner tube portion and an opposing end affixed thereto said locking button.

4. The device of claim 2, wherein said outer tube portion further comprises an elongated tube having a consistent diameter for receiving an entire length of said inner tube portion.

5. The device of claim 4, wherein said inner tube portion further comprises an elongated tube having a consistent diameter suitably sized for selective insertion thereinside said outer tube portion.

6. The device of claim 2, wherein said grip further comprises a plurality of grip apertures, each of said grip apertures disposed superjacent thereto a corresponding outer aperture.

7. The device of claim 2, wherein said distal end of said inner tube portion further comprises an outwardly extending toothed edge therearound a perimeter thereof providing said means for engaging an internal surface of said carcass.

8. The device of claim 7, wherein said proximal end of said outer tube portion further comprises an outwardly extending toothed edge therearound a perimeter thereof providing said means for engaging an internal surface of said carcass.

9. The device of claim 2, wherein said outer tube portion further comprises an outer tube end cap removably attached thereto said proximal end of said outer tube portion, and wherein said inner tube portion further comprises an inner tube end cap removably attached thereto said distal end of said inner tube portion.

10. The device of claim 9, wherein said outer tube cap further comprises a cylindrical body having an open end suitably sized to receive said proximal end of said outer tube portion and a centrally positioned spike protruding outwardly providing an alternate means of engaging said internal surface of said carcass.

11. The device of claim 10, wherein said inner tube cap further comprises a cylindrical body having an open end suitably sized to receive said distal end of said inner tube portion and a centrally positioned spike protruding outwardly providing an alternate means of engaging said internal surface of said carcass.

12. The device of claim 2, wherein said inner tube portion further comprises a plurality of notches longitudinally disposed thereon an exterior surface to provide visual positional indication of said locking button in relation thereto said plurality of outer apertures;
    wherein each of said plurality of notches corresponds thereto an engaged position between said locking button and a particular outer aperture.

13. The device of claim 2, further comprising a carrying holster having a substantially cylindrical body with an open-top pouch for receiving and storing said device affixed thereto a belt attachment strap with a two-slot belt pass-through loop thereon an upper portion thereof for attaching said holster thereto a belt of a support structure.

14. A game carcass spreading device, comprising:
    an outer tube portion comprising an elongated tube with a consistent diameter having an open distal end, a proximal end, and a plurality of outer apertures longitudinally disposed therethrough;
    an inner tube portion comprising an elongated tube with a consistent diameter having a distal end, a proximal end, and a single inner aperture;
    a locking button affixed thereto a spring for releasably coupling said outer tube portion thereto said inner tube portion for selectively adapting a fixed coupled length of said outer tube portion and said inner tube portion;
    a cylindrical grip member affixed therearound an exterior of said outer tube comprising a plurality of grip apertures, each of said grip apertures disposed superjacent thereto a corresponding outer aperture;
    a plurality of notches longitudinally disposed thereon an exterior surface of said inner tube portion providing visual positional indication of said locking button in relation thereto said plurality of outer apertures, said plurality of notches corresponding thereto an engaged position between said locking button and a particular outer aperture; and, a carrying holster having a substantially cylindrical body with an open-top pouch for receiving and storing said device affixed thereto a belt attachment strap having a two-slot belt pass-through loop thereon an upper portion thereof for attaching said holster thereto a support structure;

wherein said proximal end of said inner tube portion is insertably coupled therein said open distal end of said outer tube portion;

wherein said distal end of said inner tube portion further comprises an outwardly extending toothed edge therearound a perimeter thereof providing said means for engaging an internal surface of a game carcass;

wherein said proximal end of said outer tube portion further comprises an outwardly extending toothed edge therearound a perimeter thereof providing said means for engaging an internal surface of a game carcass;

wherein said spring urges said locking button to extend therethrough said inner aperture and selectively align therewith and engage therethrough one of said outer apertures providing said coupled length; and, wherein said locking button is depressed to disengage therefrom one of said outer apertures, in order to engage an alternate outer aperture such that an alternate fixed coupled length may be achieved.

15. The device of claim 14, wherein said spring further comprises an arcuate biasing member having an end affixed thereto an interior of said inner tube portion and an opposing end affixed thereto said locking button.

16. The device of claim 15, wherein said outer tube portion further comprises an outer tube end cap removably attached thereto said proximal end of said outer tube portion, and wherein said inner tube portion further comprises an inner tube end cap removably attached thereto said distal end of said inner tube portion.

17. The device of claim 16, wherein said outer tube cap further comprises a cylindrical body having an open end suitably sized to receive said proximal end of said outer tube portion and a centrally positioned spike protruding outwardly providing an alternate means of engaging said internal surface of said carcass.

18. The device of claim 17, wherein said inner tube cap further comprises a cylindrical body having an open end suitably sized to receive said distal end of said inner tube portion and a centrally positioned spike protruding outwardly providing an alternate means of engaging said internal surface of said carcass.

19. A method of field dressing an animal carcass utilizing a game carcass spreading device comprising the steps of:
splitting a brisket portion of said animal carcass and removing major organs from a chest cavity area in a conventional manner;
retrieving said device;
inserting said device thereinto said chest cavity in a collapsed state;
embedding a toothed edge of a distal end of said inner tube portion and a toothed edge of a proximal end of said outer tube portion therein opposing internal surfaces of said animal carcass;
grasping a grip of an outer tube portion and depressing a locking button inwardly to release an inner tube portion;
rotating said inner tube, thereby allowing said inner tube to slide freely in a linear direction within said outer tube;
extending said device against opposing side portions of said chest cavity until obtaining a desired coupled length of said device;
aligning a closest notch therewith a distal end of said outer tube portion thereby aligning an outer aperture therewith said locking button;
rotating said inner tube portion until establishing engagement of said locking button thereinto a corresponding pre-aligned outer aperture;
embedding said toothed edge of said distal end of said inner tube portion thereinto one side of said chest cavity of said animal carcass;
embedding said toothed edge of said proximal end of said outer tube portion thereinto the opposing side of said chest cavity, thereby securing said chest cavity therein a spread state;
completing a field dressing or butchering task by removing all unwanted remaining internal portions; and,
retaining said device, therewithin said animal carcass to aerate, cool, and glaze the meat as desired.

20. The method of claim 18, further comprising the steps of:
removably attaching an end cap thereto said distal end of said inner tube and thereto said proximal end of said outer tube after the aforementioned step of retrieving the device;
wherein a spike provides an alternate means to embed said device therein said internal surfaces of said animal carcass.

* * * * *